Dec. 19, 1950  J. PANHARD  2,534,621
VALVE RETURN DEVICE

Filed May 2, 1949  2 Sheets-Sheet 1

Inventor
J. Panhard
By
Wenderoth, Lind & Ponack
Attorneys

Dec. 19, 1950    J. PANHARD    2,534,621
VALVE RETURN DEVICE

Filed May 2, 1949    2 Sheets-Sheet 2

Inventor
J. Panhard
By
Wenderoth, Lind & Ponack
Attorneys

Patented Dec. 19, 1950

2,534,621

UNITED STATES PATENT OFFICE 2,534,621

VALVE RETURN DEVICE

Jean Panhard, Paris, France, assignor to Societe Anonyme des Anciens Etablissements Panhard & Levassor, Paris, France Application May 2, 1949, Serial No. 90,861
In France May 5, 1948

3 Claims. (Cl. 267—1)

My invention is concerned with a return device common to a pair of adjacent valves wherein the return levers for the valve pair are interconnected by a torsion system which is particularly compact and in which no bending stresses are imposed upon the torsionally stressed members of the device.

With this end in view, I provide a system composed of three elements, viz.: a pair of torsion sleeves rigid with the respective return levers at their abutted ends and having their opposite ends resiliently interconnected by means of a torsion bar projecting through the pair of abutted sleeves. In this manner, any rocking action exerted upon the one of said return levers is transmitted to the other through the one sleeve, the torsion bar and the other sleeve, with the result that the effective length of the resilient connection is twice its actual length.

A preferred embodiment of the valve return device according to my invention will now be described by way of exemplification and by no means of limitation reference being had to the appended drawings in which.

Figure 1:
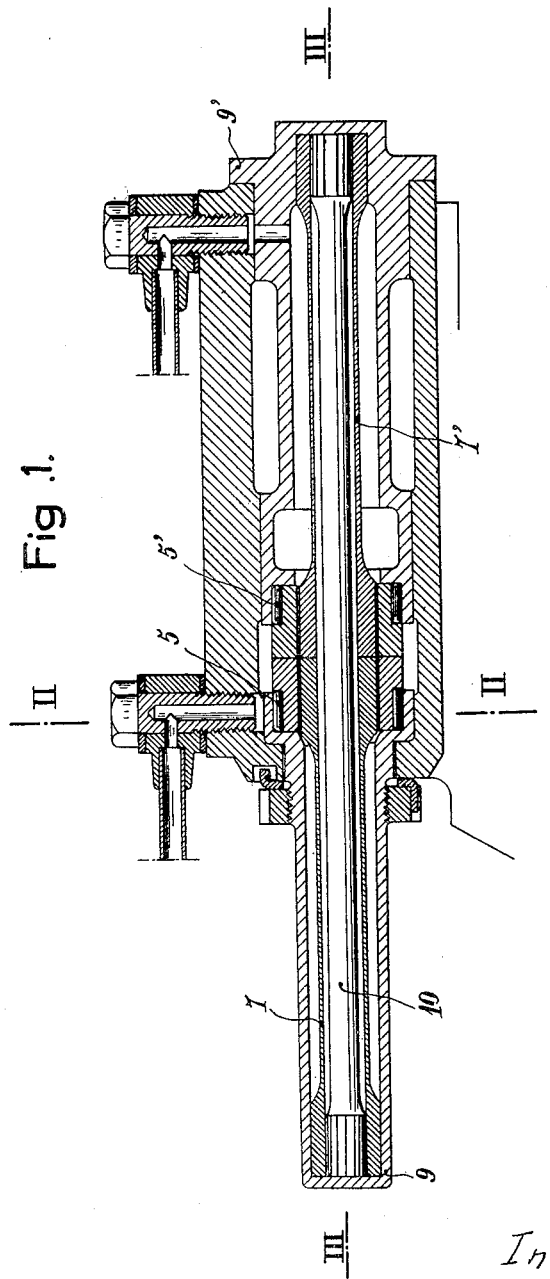
Figure 1 is a longitudinal sectional view of the resilient connection device.
Figure 2:
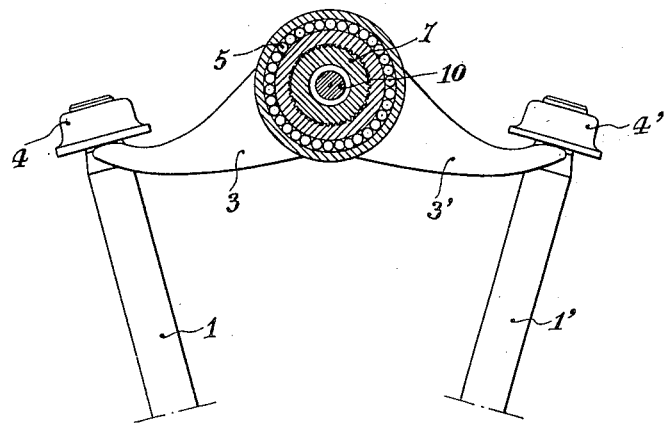
Figure 2 is a sectional view taken on line II—II in Fig. 1 and shows the valves, the return levers and the way in which either lever is splined on the inner end of one of the abutted sleeves in its position corresponding to the seated or closed position of the related valve.

The valve shanks 1, 1' are urged upwards by the levers 3, 3' acting from below upon the flanges 4, 4'. The hubs of said levers are mounted in roller bearings 5, 5' in guides 9, 9'. Moreover, said hubs are splined on the fluted inner ends of a pair of abutted torsion sleeves 7, 7' having their opposite ends rotatably mounted in the blind outer ends of said guides 9, 9'. On the other hand, said torsion sleeves are splined at the same ends on the outer ends of a torsion bar 10, thus completing the resilient connecting system. The hubs are so splined on the respective sleeve ends that in the position shown in Fig. 2 in which both valves are seated the connecting device still stands under a definite residual stress. As one of the valves is moved clear of its seat and consequently the valve shank and the flange thereon are depressed, the angular position of the related lever with respect to the other is changed and the resilient system composed of sleeve 7, bar 10 and sleeve 7' is subjected to an additional torsional stress.

Figure 3:
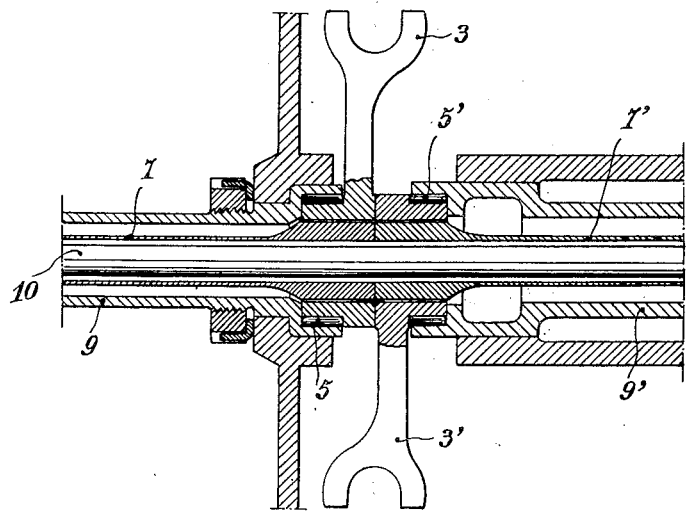
Figure 3 is a sectional view taken on line III—III in Fig. 1 and shows the position of the lever forks with respect to the abutted hubs of the levers.

Fig. 3 shows that the forks on the levers are positioned dissymmetrically with respect to the hubs.

The general character of my invention, which extends to any device adapted to load a pair of valves with the aid of coaxial levers rigid with the respective ends of a resilient system composed of concentric elements is in no way restricted by the details of construction of the embodiment described.

What I claim as my invention and desire to secure by Letters Patent is:

1. A device adapted to load a pair of valves comprising a pair of valve-return levers, a fluted cylindrical aperature in the hub of each lever, a pair of sleeves fluted at their outsides at one end thereof, abutted to each other at their fluted ends and splined at said ends each in the fluted hub of one of said levers and resiliently interconnected by a torsion member.

2. A device adapted to load a pair of valves according to claim 1 wherein the sleeves are fluted inside each at its end remote from its externally fluted one, the sleeve-interconnecting torsion member consists of a resilient bar projecting through the pair of abutted sleeves, fluted at either end thereof and splined at said ends in the internally fluted ends of the torsion sleeves.

3. A return device provided in common for a pair of valves in a same engine comprising a torsion bar, a pair of torsion sleeves concentric to and surrounding said bar, the outer ends of said sleeves being fixed to the ends of said bar while their inner ends are directed toward each other, and a pair of return levers each controlling one of said valves and fixed one at each of said inner ends of said sleeves respectively.

JEAN PANHARD.

REFERENCES CITED

The following references are of record in the file of this patent:

UNITED STATES PATENTS

| Number | Name | Date |
|---|---|---|
| 2,100,057 | Krebs | Nov. 23, 1937 |
| 2,333,008 | Holmstrom et al. | Oct. 26, 1943 |
| 2,395,183 | Holmstrom et al. | Feb. 19, 1946 |